(12) United States Patent
Steiner

(10) Patent No.: US 6,435,827 B1
(45) Date of Patent: Aug. 20, 2002

(54) APPARATUS FOR GENERATING A FLUID FLOW

(76) Inventor: James Steiner, 10 Sleepy Hollow La., Cincinnati, OH (US) 45201

( * ) Notice: Subject to any disclaimer, the term of this patent is extended or adjusted under 35 U.S.C. 154(b) by 0 days.

(21) Appl. No.: 09/698,325

(22) Filed: Oct. 27, 2000

(51) Int. Cl.$^7$ .............................. F01D 23/00; F03B 9/00
(52) U.S. Cl. .................................... 416/8; 416/7; 415/5
(58) Field of Search ........................... 415/5, 125, 141; 416/7, 8

(56) References Cited

U.S. PATENT DOCUMENTS

| 685,016 | A | | 10/1901 | Towsley | |
|---|---|---|---|---|---|
| 742,529 | A | * | 10/1903 | Trenchard et al. ............. | 416/7 |
| 1,131,680 | A | * | 3/1915 | Cooke ........................... | 415/5 |
| 1,493,412 | A | | 5/1924 | Abbey | |
| 2,548,615 | A | | 4/1951 | Petr, Jr. ....................... | 230/240 |
| 2,553,001 | A | | 5/1951 | Petr, Jr. ........................... | 230/1 |
| 3,270,805 | A | | 9/1966 | Glucksman .................. | 165/122 |
| 4,049,300 | A | | 9/1977 | Schneider .................... | 290/54 |
| 4,113,205 | A | | 9/1978 | Shaw ........................... | 244/20 |
| 4,186,314 | A | | 1/1980 | Diggs ........................... | 290/55 |
| 4,536,125 | A | | 8/1985 | Herman et al. ................. | 415/5 |

* cited by examiner

Primary Examiner—F. Daniel Lopez
Assistant Examiner—Kimya N McCoy
(74) Attorney, Agent, or Firm—Wood, Herron & Evans, L.L.P.

(57) ABSTRACT

An apparatus for generating a fluid flow is disclosed that circulates a plurality of spaced blades or airfoils attached to one or more drive belts about two or more spaced rotatable members. Each blade is commonly journalled with another blade. The inclination angles of each blade and each commonly journalled blade are independently controlled by a control mechanism.

22 Claims, 4 Drawing Sheets

APPARATUS FOR GENERATING A FLUID FLOW

FIELD OF THE INVENTION

This invention relates to an apparatus for generating a fluid flow and, more particularly, to a linear fan assembly having commonly journalled airfoils whose circuitous motion imparts aerodynamic lift to an attached air frame.

BACKGROUND OF THE INVENTION

Linear fan assemblies have been used to direct or respond to the flow of a fluid in applications such as a power plant for an aircraft, a blower for creating a forced fluid current, a wind mill or a water wheel for power generation. In each of these diverse applications, the linear fan assembly circulates a plurality of blades on a belt or chain in a closed path about two or more rotating members. In certain linear fan assemblies, the blades are pivotably adjustable for maintaining a fluid flow in a consistent direction relative to the path of the moving belt as the blades circulate.

If the linear fan assembly is deployed as a power plant for an aircraft, the blades of the linear fan are shaped as airfoils that, when moved through the air, provide lift to an attached air frame or fuselage. The lift output by the linear fan is modified by changing the inclination angle of the airfoils such as by means of an interconnection of each airfoil with a moveable control channel. Despite the known use of linear fans to power an aircraft, conventional linear fans have been heretofore incapable of providing a compact structure that optimizes the air flow through the configuration of the aircraft and its air frame.

SUMMARY OF THE INVENTION

The present invention solves these and other shortcomings in the prior art by providing an apparatus for generating a fluid flow which, in a presently preferred embodiment, includes two rotatable members carried in a spaced relationship by respective axes of rotation in a support frame and a motor operably coupled for powering at least one of the rotatable members. A drive belt connects the rotatable members and a plurality of blade pairs is coupled to the drive belt. Each of the blade pairs has first and second blades in which each blade has an inclination angle and is pivotably coupled to the drive belt along an axis generally parallel to the axes of rotation of the rotatable members. Each said first blade is commonly journalled with one of the second blades. A control mechanism is coupled to each of said blades for independently adjusting the inclination angle of each blade.

In certain embodiments, the control mechanism comprises a plurality of control channels attached to the support frame and each blade may be coupled with a control channel via a control link. When the control channel is moved relative to the drive belt, the inclination angle of each blade is adjusted independently of the inclination angle of the respective commonly journalled blade.

In other embodiments, an apparatus is provided for generating a fluid flow that comprises two rotatable members mounted to a support frame in a spaced relationship, wherein each said rotatable member is configured for rotation about respective, generally parallel axes. A motor is operably coupled for selectively rotating at least one of the rotatable members. Two drive belts connect the rotatable members and traverse respective paths each having an upper flight and a lower flight. Two control channels are attached to the support frame, wherein each control channel is associated with one of the drive belts. A plurality of spaced blades is coupled to at least one of the drive belts and a plurality of control links each couple one of the blades to one of the control channels. Each blade is commonly journalled with another blade along an axis generally parallel to the axes of rotation of the rotatable members. Each blade has an inclination angle that is independently adjustable relative to the inclination angle of its commonly journalled blade.

The present invention provides an aircraft, linear fan or similar device having a simplified fluid flow control system with an integrated lift, propulsion and steering system in the form of independent control channels controlling the inclination angles of independent sets of circulating airfoils. Fluid flow control is established by simply moving each control channel relative to the path of the circulating airfoils.

These and other objects and advantages of the present invention shall become more apparent from the accompanying drawings and description thereof.

BRIEF DESCRIPTION OF THE DRAWINGS

The accompanying drawings, which are incorporated in and constitute a part of this specification, illustrate presently preferred embodiments of the invention and, together with a general description of the invention given above, and the detailed description given below, serve to explain the principles of the invention.

DETAILED DESCRIPTION

Figure 1:
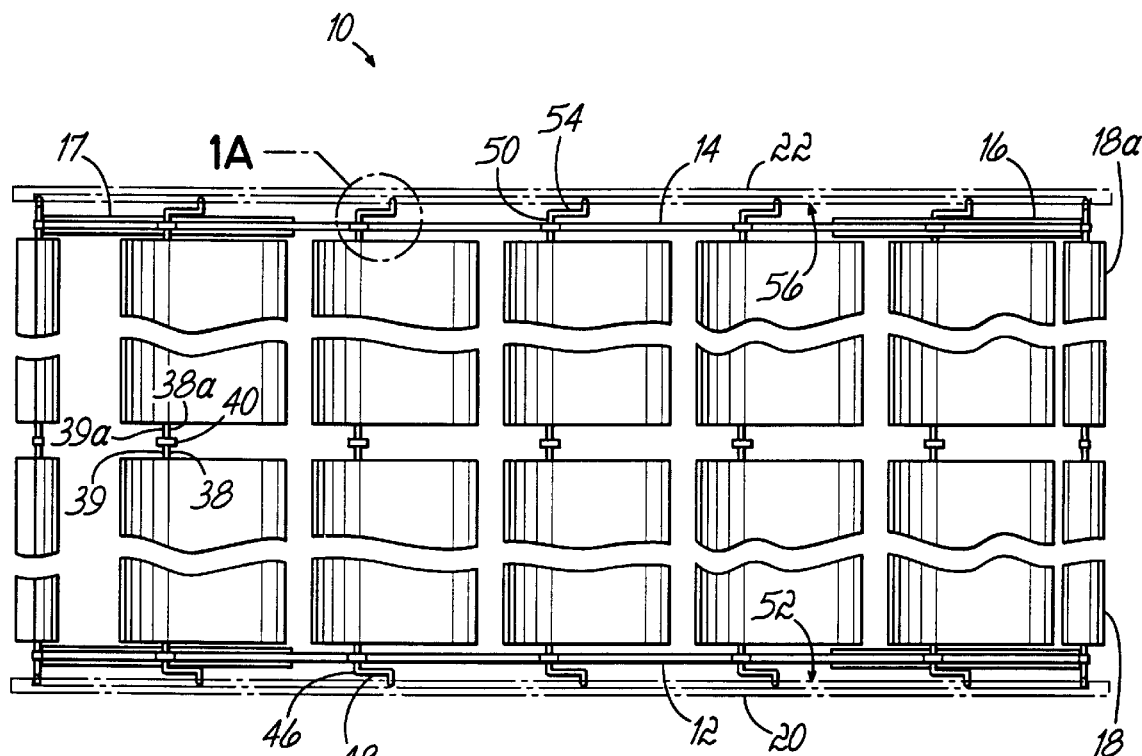
FIG. 1 is a diagrammatic plan view of a linear fan according to the present invention.
Figure 2:
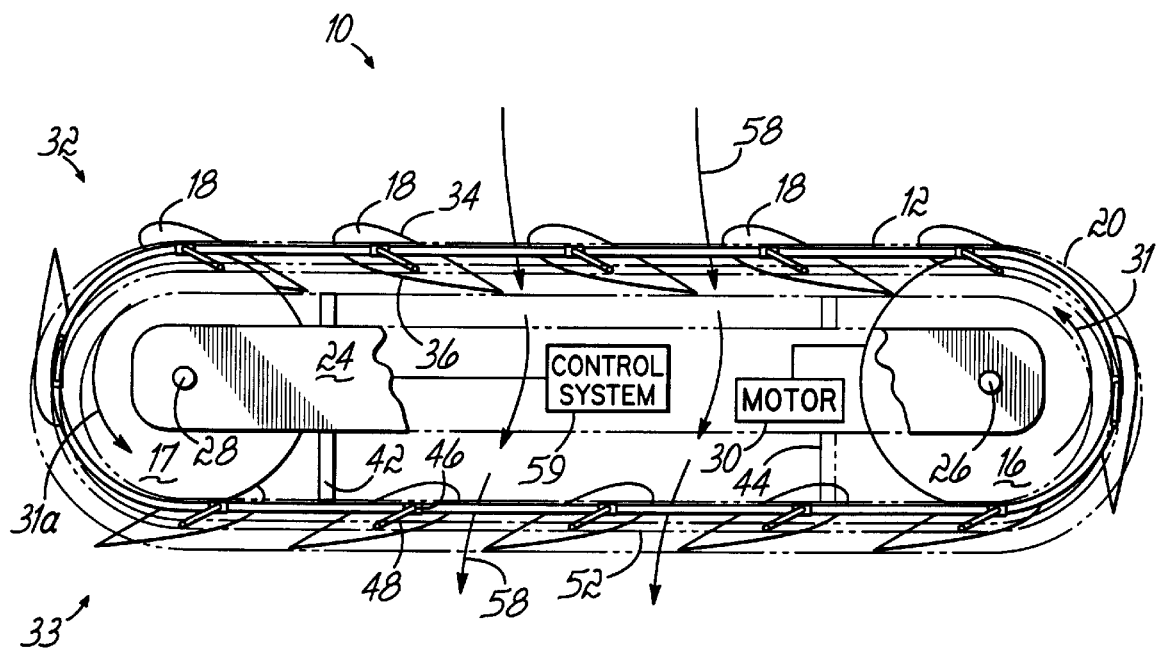
FIG. 2 is a diagrammatic side view of a linear fan according to the present invention.

A linear fan, according to a presently preferred embodiment of this invention, is indicated generally by reference numeral 10 and presented in FIGS. 1 and 2. Linear fan 10 includes two drive belts 12 and 14 mounted between a pair of rotatable members 16 and 17, although additional rotatable members could be included. Fan blade pairs each include a first blade 18 pivotably coupled to the drive belt 12 and a second blade 18a pivotably coupled to the drive belt 14. A first and a second control channel 20 and 22 is associated with drive belt 12 and 14, respectively. Rotatable members 16 and 17 are positioned in a spaced relationship and are rotatably carried by shafts 26 and 28, respectively, on a support frame 24. Each rotatable member 16 and 17 is rotatable with respect to an axis of rotation parallel to a longitudinal axis of shafts 26 and 28, respectively. Rotatable members 16 and 17 may each comprise one or more drums, pulleys, sprockets, or other similar structures. As an exemplary configuration, each rotatable member 16, 17 comprises two pulleys attached to shafts 26 and 28, respectively, wherein each belt 12, 14 extends between a spaced pair of pulleys.

A motor 30 is operably coupled to rotatable member 16 and, when energized, motor 30 rotates rotatable member 16 about the shaft 26. Motor 30 is coupled with rotatable member 16 in a manner known to those of ordinary skill in the art for providing an output drive torque, such as a gear train, a planetary gear transmission, or a belt drive assembly. When the motor 30 is energized, rotatable member 16 rotates in the sense indicated by arrow 31 (FIG. 2). Rotatable member 17 may also be connected to motor 30 for driven rotation without departing from the spirit and scope of the present invention. Alternatively, a second motor, not shown but similar to motor 30, may be operably connected to rotatable member 17, as familiar to those of ordinary skill in the art, to provide redundancy in powering the linear fan 10. A dual-motor propulsion system would provide sufficient power to facilitate continued flight operations, particularly during take-offs and landings, in the event of a single motor failure.

Each drive belt 12 and 14 interconnects rotatable members 16 and 17 in a continuous and endless fashion. Because of the interconnection, rotatable member 17 is constrained by the drive belts 12 and 14 to rotate in the direction shown by arrow 31a (FIG. 2) as the motor 30 turns rotatable member 16 in the sense of arrow 31 (FIG. 2). Either of the drive belts 12 and 14 may be replaced with a chain or other structure without departing from the spirit and scope of the present invention. Referring to FIG. 2, each drive belt 12 and 14 traverses a closed path that is generally oval and includes an upper flight 32 vertically spaced above a lower flight 33. The paths of the drive belts 12 and 14 are stationary relative to the support frame 24. The path of the upper flight 32 is generally parallel to the path of lower flight 33. The terms "upper flight" and "lower flight" are used herein to simplify description of the linear fan 10 in connection with the orientation of the support frame 24 as shown in the figures and their use is not intended to limit the present invention. Further, the description of the orientation of linear fan 10 is not limited by the definition of "vertical" and "horizontal" directions, which are used herein for purposes of reference only.

According to the present invention, a blade pair includes blades 18 and 18a which may have an aerodynamic shape, such as being formed in the shape of an airfoil. An airfoil is a body, part, or surface designed to provide a useful reaction on itself, such as lift or thrust, when in motion through the air or other fluid medium. Referring to FIG. 2, each blade 18 and 18a includes a first air flow surface 34 and a second air flow surface 36 having substantially identical curvatures or cambers so that each blade 18 and 18a can generate lift or thrust independent of which air control surface 34, 36 is providing the lift. The curvature of each blade 18, 18a is referenced to the wing chord, which is a straight line connecting the leading and trailing edges of each blade. The transverse dimension or width of blades 18 and 18a is not limited other than with regard to the overall dimensions of linear fan 10.

Each blade 18 is pivotably carried by drive belt 12 on a shaft 38 and, similarly, each blade 18a is pivotably carried by drive belt 14 on a shaft 38a. Each shaft 38 is commonly journalled with one of the shafts 38a along an axis generally parallel to the axes of rotation of rotatable members 16 and 17. As used herein, the term "commonly journalled" means that the respective blades are coupled together via one or more shafts. To this end, a shaft connector 40 is positioned at the junction between each pair of shafts 38 and 38a. Each shaft connector 40 includes a pair of internal surface that receive the inner ends 39 and 39a of each shaft 38 and 38a, respectively, in a manner as known in the art that permits rotation. Each shaft 38 is rotatable independent of its commonly journalled shaft 38a so that the inclination angle of blades 18 and 18a may be independently varied. In other words, the inclination angle of blade 18 may be adjusted without changing the inclination angle of commonly journalled blade 18a, and vice versa.

The first control channel 20 is attached to one transverse side of support frame 24 by a first brace 42 and a second brace 44. Similarly, the second control channel 22 is attached to the opposed transverse side of support frame 24 by two braces (not shown but similar to braces 42 and 44). The first control channel 20 is circumferentially associated with the path traversed by first drive belt 12. Likewise, the second control channel 22 is circumferentially associated with the path traversed by second drive belt 14. The first and second control channels 20, 22 are non-rotating and stationary relative to the drive belts 12, 14.

Referring to FIG. 2, each blade 18 has an inclination angle $\theta$ relative to the direction of motion of the drive belt 12 that depends upon the vertical separation X of the first control channel 20 relative to the path of drive belt 12. The inclination angle determines the amount of lift provided by each individual blade 18. It is understood that similar relationships exist between blades 18a, drive belt 14 and second control channel 22. The inclination angle $\theta$, or angle of attack of blades 18, 18a, is defined herein as the angle between the chord or centerline of the blade, or airfoil, and the direction of motion of the respective drive belts 12, 14.

Figure 1A:
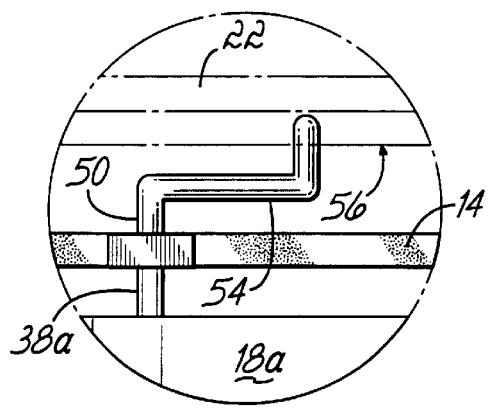
FIG. 1A is an enlarged view of encircled area "1A" of FIG. 1.

An outer end 46 of each shaft 38 terminates with a control link 48 that couples each blade 18 with a pitch-control groove 52 provided in the first control channel 20. Similarly, an outer end 50 of each shaft 38a terminates with a control link 54 that couples each blade 18a with a pitch-control groove 56 provided in the second control channel 22. As best shown in FIG. 1A, each control link 54 is an integral, L-shaped extension of the control shaft 38a that has a peripheral portion which protrudes into the pitch-control groove 56 of the second control channel 22. A similar relationship exists between each control link 48 and shaft 38. To reduce friction, the pitch-control grooves 52, 56 may be lined with Teflon® or coated with a topical lubricant such as a graphite, or the interface between the pitch-control grooves 52, 56 and the control link 48, 54, respectively, may be provided with a bearing interface. It is appreciated that the control mechanism may comprise alternative types of electromechanical, hydraulic or mechanical systems without departing form the spirit and scope of the present invention.

With reference to first control channel 20 and blades 18 shown in FIG. 2, the inclination angle $\theta$ of each blade 18 may be modified by displacing first control channel 20 in a vertical direction relative to the direction of motion of drive belt 12. Specifically, movement of first control channel 20 in an upward vertical direction increases the inclination angle of each blade 18 by pivoting shaft 38 due to the engagement between control link 48 and pitch-control groove 52. As control link 48 pivots, the blade 18 is constrained to pivot with control shaft 38. As shown in FIG. 2, the inclination angle $\theta$ of each blade 18 is identical due to the uniformity of the separation distance X between the first control channel 20 and the drive belt 12. Similarly, movement of first control channel 20 in a downward vertical direction decreases the inclination angle $\theta$ of each blade 18 by pivoting control link 48. A similar relationship exists for the inclination angle $\theta$ of each blade 18a, which is controlled by vertical movement of the second control channel 22 relative to drive belt 14.

Referring to FIG. 2, the circulation of blades 18 accelerates the air downward to produce an air flow, indicated generally by arrows 58, for providing a reactive lift force to support frame 24. According to the present invention, air is accelerated in a consistent downward vertical direction by blades 18 moving on the upper flight 32 and by blades 18 moving on the lower flight 33. Specifically, the angle of inclination θ of each blade 18 is identical whether moving on the upper flight 32 or on the lower flight 33 relative to the direction of motion of drive belt 12. A similar relationship holds for each blade 18a moving on drive belt 14. Therefore, the inclination angles θ of each blade 18 and each blade 18a are consistent with the direction of motion of drive belts 12 and 14, respectively, to promote air flow through the linear fan 10.

Referring to FIG. 2, a motion control system 59 is configured to move first control channel 20 relative to support frame 24. Specifically, control system 59 is operable for translating flight instructions provided by an operator to move braces 42 and 44 vertically relative to support frame 24. If the motion control system 59 moves the opposed ends of control channel 20 by equal vertical distances relative to the drive belt 12, the inclination angle θ of each blade 18 will change by an equal angular increment. As the inclination angle θ of blade 18 increases, the amount of lift generated by blade 18 and imparted to the support frame 24 likewise increases. Similarly, motion control system 59 is operable for moving second control channel 22 vertically relative to support frame 24 and adjusting the inclination angle θ of each blade 18a. If blades 18 and 18a have differing inclination angles θ, the thrust output by linear fan 10 can be vectored for lateral steering.

Figure 2A:
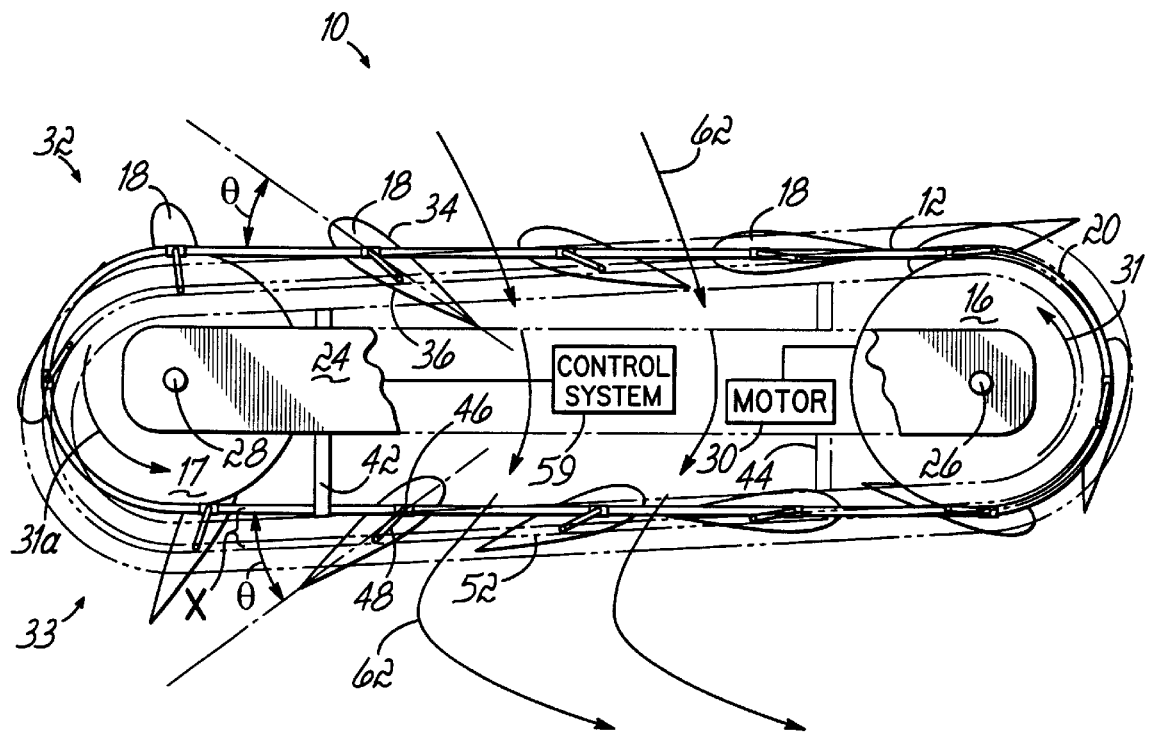
FIG. 2A is a diagrammatic side view as in FIG. 2 with a control channel tilted relative to the drive belt.

Referring to FIG. 2A, according to the present invention, the control channel 20 may be tilted relative to the path of drive belt 12 to gradate the inclination angle θ of each blade 18 along the upper and lower flights 32, 33. The flow of air produced by the gradation in inclination angle θ is diagrammatically indicated by numeral 62 on FIG. 2A. The flow of air 62 represents air molecules ballistically accelerated for providing lift and thrust to the support frame 24. To tilt the first control channel 20, the motion control system 59 (FIG. 2) adjusts the vertical positions of the opposed ends of control channel 20 relative to support frame 24 by moving braces 42 and 44. Since the inclination angle of each blade 18 depends upon the separation between the first control channel 20 and drive belt 12, blades 18 moving along upper and lower flights 32 and 33 have inclination angles in proportion to the displacement between first control channel 20 and drive belt 12.

Figure 3:
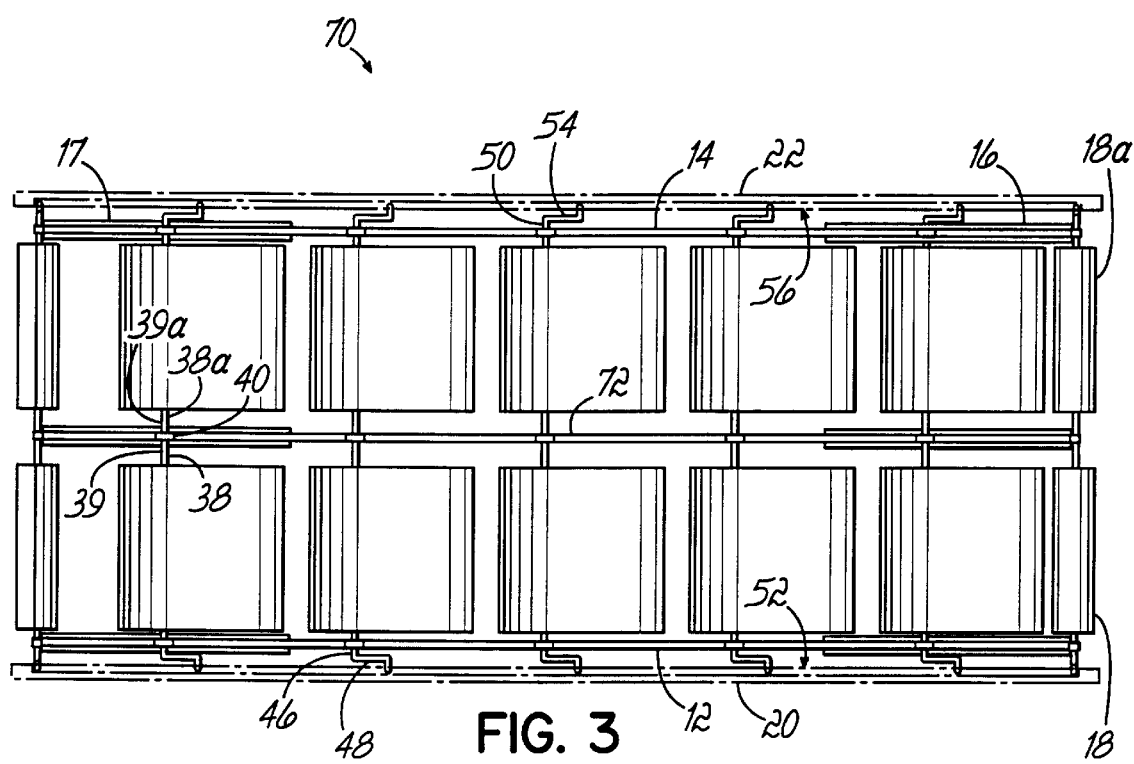
FIG. 3 is a diagrammatic top view of an alternative embodiment of a linear fan in accordance with the present invention.

An alternative presently preferred embodiment of a linear fan 70 according to the present invention is shown in FIG. 3, in which like reference numerals refer to like features described above with reference to FIGS. 1 and 2. Linear fan 70 includes a third drive belt 72 that extends between drive members 12 and 14 and positioned between blades 18 and blades 18a. Each shaft connector 40 is attached to a surface of the third drive belt 72. The addition of third drive belt 72 and the ability to attach the shaft connectors 40 thereto provides additional support for the inner ends 39 and 39a of the shafts 38 and 38a, respectively, for lending mechanical rigidity to the linear fan 70.

Figure 4:
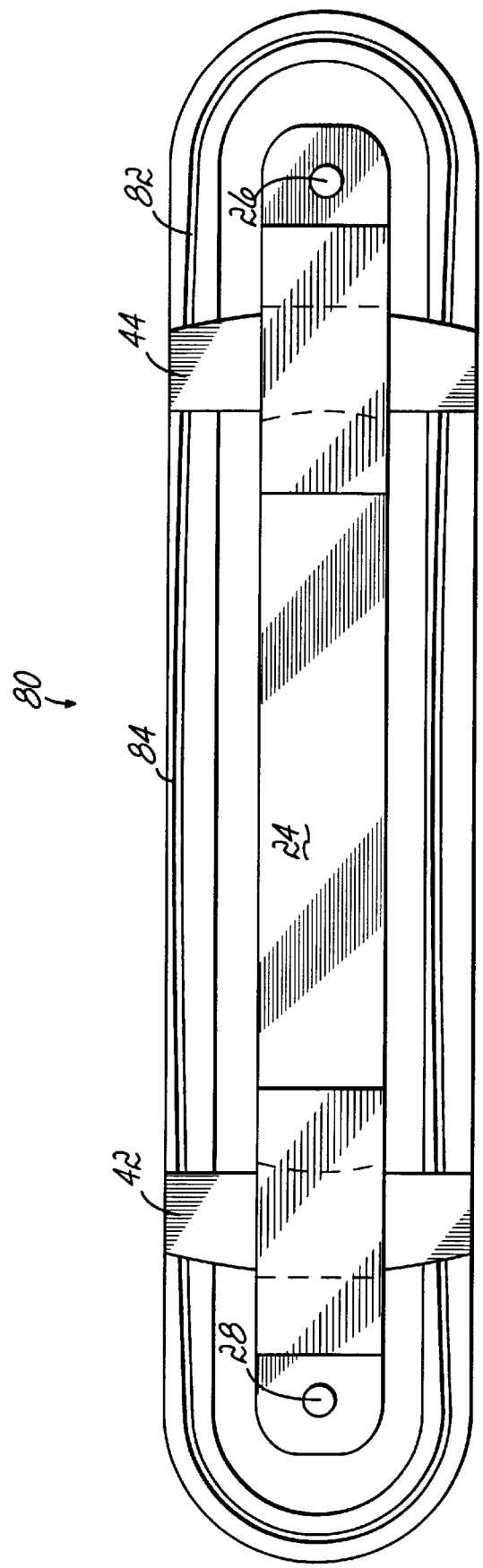
FIG. 4 is a diagrammatic side view of an alternative embodiment of a control channel for use with a linear fan in accordance with the present invention.

An alternative embodiment of a control channel 80, according to the present invention, for use with linear fans 10 and 70 is presented in FIG. 4. A pitch-control groove 82 extends circumferentially about the interior of control channel 80. Pitch-control groove 82 has an arcuate profile with an apex 84 near the midpoint between rotatable members 16 and 17 (FIG. 2). The arcuate profile of pitch-control groove 80 is selected to adjust the tension of drive belts 12 and 14 (FIG. 1) and compensate for bowing.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, the linear fan of the present invention may be used for power generation by substituting a generator for the motor driving the rotatable member and permitting an atmospheric air flow to act upon the airfoils. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. An apparatus for generating a fluid flow comprising:
   a support frame;
   two rotatable members mounted to said support frame, each said rotatable member configured for rotation about a respective axis;
   a motor operably coupled to at least one of said rotatable members, said motor selectively rotating the at least one rotatable member;
   a drive belt connecting the rotatable members and traversing a path, said drive belt traversing an upper flight and a lower flight;
   a plurality of shafts spaced along the path, each shaft pivotally coupled with said drive belt and oriented generally parallel to said axes of said rotatable members;
   a plurality of blade pairs each having first and second blades, wherein each said first blade is commonly journalled on a corresponding one of said shafts with one of said second blades such that each of said first and second blades is independently pivotal for providing a first and a second inclination angle, respectively; and
   a control mechanism coupled to each of said shafts, wherein the first and second inclination angles in each of the blade pairs is independently adjustable by the control mechanism.

2. The apparatus of claim 1, wherein the control mechanism further comprises a plurality of control channels and wherein at least one of said control channels is moveable relative to the path of the drive belt.

3. The apparatus of claim 2, wherein the least one control channel is adjustable relative to the path of the drive belt for uniformly adjusting the inclination angle of each blade coupled with the at least one control channel.

4. The apparatus of claim 2, wherein the first inclination angle differs from the second inclination angle when said blades are positioned on one of said upper flight and said lower flight of said drive belt.

5. The apparatus of claim 2, further comprising a control system for moving the at least one control channel relative to the path of the drive belt.

6. The apparatus of claim 2, wherein the at least one control channel has an arcuate profile along the upper and lower flights.

7. The apparatus of claim 6, wherein the arcuate profile along the upper flight has a substantially identical curvature to the arcuate profile along the lower path.

8. The apparatus of claim 1, wherein each said blade comprises an aerodynamically-shaped airfoil.

9. The apparatus of claim 8, wherein each said airfoil includes an upper air flow surface and a lower air flow surface, wherein said upper and lower air flow surfaces have substantially identical contours.

10. The apparatus of claim 1, wherein the inclination angle for each of the blades is substantially the same along the upper and lower flights.

11. The apparatus of claim 1, wherein the control mechanism comprises a plurality of control links, each of which couple one of the blades to a control channel.

12. An apparatus for generating a fluid flow comprising:
a support frame;
two rotatable members mounted to said support frame in a spaced relationship, each said rotatable member configured for rotation about respective, generally parallel axes;
a motor operably coupled to at least one of said rotatable members, said motor selectively rotating the at least one rotatable member;
a first and a second drive belt each connecting the rotatable members, said drive belts traversing respective paths and each having an upper flight and a lower flight;
a first and a second control channel each attached to said support frame, said first and second control channels being associated with the first and second drive belts, respectively;
a plurality of shaft pairs mounted between the drive belts and spaced along the respective paths, each shaft pair oriented generally parallel to said axes of said rotatable members, and each shaft pair having first and second shafts with respective ends commonly journalled together and respective opposite ends pivotally coupled to different ones of said drive belts;
a plurality of blades each attached to one of said first and second shafts of each shaft pair, each blade having an independently-adjustable inclination angle; and
a plurality of control links each coupling one of said first and second shafts to one of said control channels, wherein pairs of said control links are operative to independently move said first and second shafts in a shaft pair for independently adjusting the inclination angle of each blade attached to the commonly journalled shaft pair.

13. The apparatus of claim 12, wherein at least one of said control channels is moveable relative to the path of the respective drive belt.

14. The apparatus of claim 13, wherein the least one control channel is adjustable relative to the path of the associated drive belt for uniformly adjusting the inclination angle of each of the blades coupled with the at least one control channel.

15. The apparatus of claim 13, wherein the inclination angle of each blade coupled with the at least one control channel differs from the inclination angles of adjacent blades when said blades are positioned on one of said upper flight and said lower flight of said drive belt.

16. The apparatus of claim 13, further comprising a control system for moving the at least one control channel relative to the path of the drive belt.

17. The apparatus of claim 12, wherein each said blade comprises an aerodynamically-shaped airfoil.

18. The apparatus of claim 17, wherein each said airfoil includes an upper air flow surface and a lower air flow surface, wherein said upper and lower air flow surfaces have substantially identical contours.

19. The apparatus of claim 12, wherein the inclination angle for each of the blades is substantially the same along the upper and lower flights.

20. The apparatus of claim 13, wherein the at least one control channel has an arcuate profile along the upper and lower flights.

21. The apparatus of claim 12, wherein the arcuate profile along the upper flight has a substantially identical curvature to the arcuate profile along the lower path.

22. A propulsion system for an aircraft having an air frame, said propulsion system comprising:
two rotatable members mounted to the air frame in a spaced relationship, each said rotatable member configured for rotation about a respective axis;
a motor operably coupled to at least one of said rotatable members, said motor selectively rotating the at least one rotatable member;
three drive belts connecting the rotatable members, said drive belts traversing a path having an upper flight and a lower flight;
a first and a second control channel each attached to the air frame, said first and second control channels being associated with one of said drive belts;
a plurality of shaft pairs mounted between the drive belts and spaced along the respective paths, each shaft pair oriented generally parallel to said axes of said rotatable members, and each shaft pair having first and second shafts with respective ends commonly journalled together and respective opposite ends pivotally coupled to different ones of said drive belts;
a plurality of airfoils each attached to one of said first and second shafts of each shaft pair, each airfoil having an independently-adjustable inclination angle; and
a plurality of control links each coupling one of said first and second shafts to one of said control channels, wherein pairs of said control links are operative to independently move said first and second shafts in a shaft pair for independently adjusting the inclination angle of each airfoil attached to the commonly journalled shaft pair.

* * * * *